United States Patent [19]

Villata

[11] Patent Number: 5,609,233
[45] Date of Patent: Mar. 11, 1997

[54] HYDRAULICALLY ACTUATED MOTOR VEHICLE CLUTCH OF THE PULL TO RELEASE TYPE

[75] Inventor: Gino Villata, Buttigliera D'Asti, Italy

[73] Assignee: Valeo, Paris, France

[21] Appl. No.: 446,637

[22] PCT Filed: Sep. 20, 1994

[86] PCT No.: PCT/FR94/01096

§ 371 Date: May 25, 1995

§ 102(e) Date: May 25, 1995

[87] PCT Pub. No.: WO93/09313

PCT Pub. Date: Apr. 6, 1995

[30] Foreign Application Priority Data

Sep. 29, 1993 [IT] Italy ...................... 93 11574

[51] Int. Cl.⁶ .................................. F16D 25/08
[52] U.S. Cl. ................. 192/91 A; 192/89.24; 192/110 B
[58] Field of Search .............. 192/91 A, 89.24, 192/98, 99 S, 110 B

[56] References Cited

U.S. PATENT DOCUMENTS 3,955,660   5/1976   Poon et al. .
4,969,547   11/1990  Lionell ....................... 192/98
5,113,989   5/1992   Feigler .

FOREIGN PATENT DOCUMENTS 0095841   12/1983  European Pat. Off. .
2304826   10/1976  France .
2674922   10/1992  France .
1425355   3/1969   Germany ............................ 192/91 A
2131393   6/1978   Germany ............................ 192/91 A
2815971   10/1979  Germany .

*Primary Examiner*—Andrea L. Pitts
*Attorney, Agent, or Firm*—Longacre & White

[57] ABSTRACT

A friction clutch of the pull to release type, includes a clutch casing (10) within which there is arranged a declutching control device (20), which comprises a clutch release bearing and a hydraulic actuating device (26, 34) that comprises at least one actuating piston (34), which is arranged to urge the clutch release bearing (20) axially in a first direction (F1) so as to disengage the clutch when the hydraulic actuating device is supplied with fluid under pressure, together with a lever (44) having a body (46), a first end portion (50) and a second end portion (60). The body (46) of the lever (44) extends through an oblong aperture formed in the wall of the casing (10), while the second end portion of the lever (44) projects outside the casing (10) so as to enable the clutch release bearing (20) to be urged, through the piston (26, 34), axially in a second direction (F2) opposite to the first direction (F1).

10 Claims, 2 Drawing Sheets

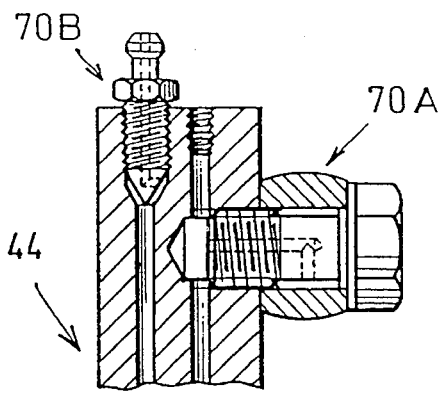
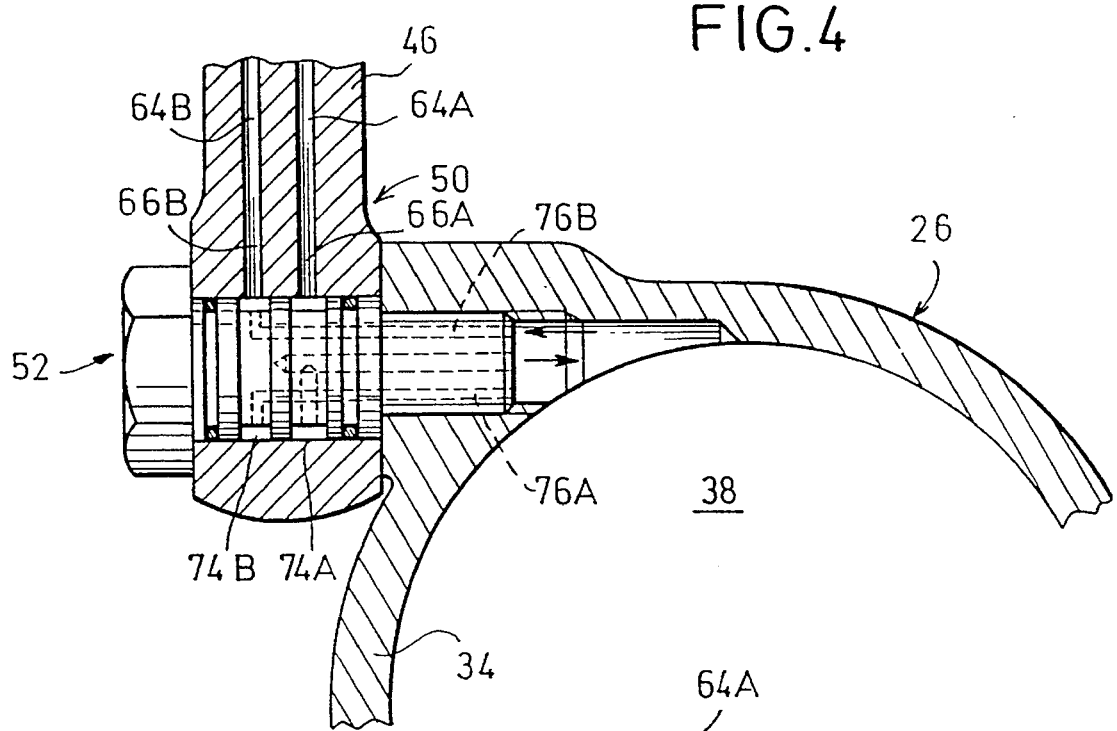
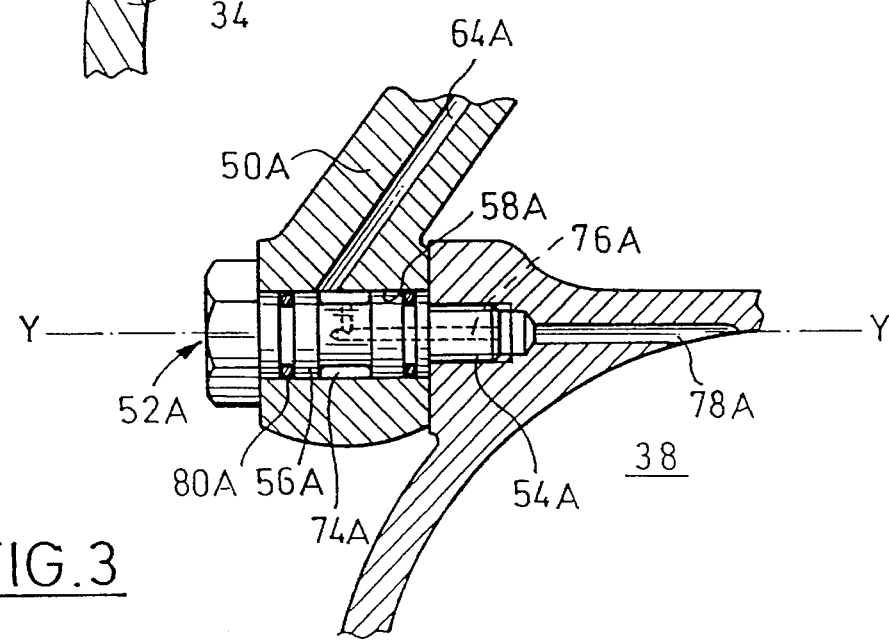
FIG.4
FIG.3

HYDRAULICALLY ACTUATED MOTOR VEHICLE CLUTCH OF THE PULL TO RELEASE TYPE

BACKGROUND OF THE INVENTION a) Field of the Invention

The present invention relates to a friction clutch, especially for a motor vehicle.

The invention is concerned more particularly with a clutch of the pull to release type, one embodiment of which is described and shown in the documents FR-A-2 304 826, FR-A-2 653 195 (U.S. Pat. No. 5,113,989), DE-A-2 815 971.

b) Description of Related Art

A clutch of this type comprises a friction disc which is disengageably coupled in rotation to a rotatable drive shaft (the crankshaft of the engine in the case of a motor vehicle), a control member which is arranged to control disengagement of the friction clutch from the drive shaft when an axial tractive force is exerted on it, and a clutch release bearing which is arranged to work axially in traction on the control member of the clutch.

Such a clutch, as shown in the document FR-A-2 304 826, may be of the mechanically controlled type, that is to say of the type which has a fork for control of the declutching operation, which is made in the form of a lever pivoted on the clutch casing, with its inner end working axially on a sliding sleeve, one end of which is coupled axially, for example, to the outer ring of the ball bearing which is part of the clutch release bearing.

As described in that document, the use of the mechanical declutching control fork, in a direction opposite to that which provides the declutching function, enables an element coupled to the inner ring of the ball bearing of the clutch release bearing to be coupled, in fixed relationship in an axial tractive mode, with a component which works on a diaphragm or on declutching levers, this coupling being obtained by means of resilient mating which may also be called clipping.

Various clutch designs are also known which include a hydraulic actuating device that includes at least one actuating piston, one end of which works on the clutch release bearing so as to urge the said release bearing axially in a first direction, in order to disengage the clutch when the hydraulic actuating device is supplied with fluid from a pressurized fluid source, such as for example a clutch cylinder.

One example of such a hydraulically actuated clutch is described and shown in the document U.S. Pat. No. 3,955,660, in which the actuating piston is made in the form of a cylindrical sleeve mounted for sliding movement on a cylindrical guide surface fixed to the clutch casing.

Such a hydraulically actuated clutch, which no longer includes a mechanical actuating fork for the clutch release bearing, does not enable initial fastening, by means of resilient mating, to be obtained between the output member of the clutch release bearing and the member which acts on the pressure plate.

Such a type of clutch also has other disadvantages, among which are those related to the supply of pressurized fluid to the actuating chamber of the hydraulic piston, which makes it necessary to provide at least one pressurized fluid supply duct which extends inside the clutch casing, and which can be connected hydraulically to the actuating chamber and to the pressurized fluid source, and in connection with which, in the interest of its good mechanical strength, it is in general necessary to provide means for preventing rotation of the actuating piston.

Such means are described in the document DE-A-2 815 971. In this latter, the hydraulic actuating device further includes a mechanical lever having a body, a first end portion coupled in axial translation to the piston and pivoted on the latter about a pivot axis at right angles to the axis of axial sliding movement of the piston, and a second end portion, with the said lever passing through a cylindrical hole in the wall of the casing.

In practice it is the second end portion of the lever that extends through the wall of the casing, being flush with the latter.

With this type of embodiment, it is not possible to carry out initial fastening, by resilient mating, between the output member of the clutch release bearing and the member which acts on the pressure plate.

SUMMARY OF THE INVENTION

An object of the present invention is to propose a new design for a hydraulically actuated clutch of the pull to release type, which provides a remedy for the disadvantages which have just been described.

In accordance with the invention, a friction clutch of the pull to release type having a lever, of the type described above, is characterized in that the body of the mechanical lever extends through an oblong aperture formed in the wall of the casing, in that the second end portion of the mechanical lever projects outside the casing so as to enable the clutch release bearing to be urged axially, through the piston, in a second direction opposite to the first direction so that the said mechanical lever is an actuating lever.

Preferably, the second end portion of the actuating lever is profiled for cooperation with a tool.

For example, this second end portion may consist of a head into which a hollow tool can penetrate in a complementary manner.

By virtue of these arrangements it is possible to displace the piston axially in its second direction in order to snap-fit the clutch release bearing on its associated actuating member.

In normal operation, the said lever does not hinder the displacement of the release bearing, because the aperture in tile casing is oblong in form, the dimension of the said aperture being a function of the displacement of the piston.

In accordance with further features of the invention:

the pivot axis of the lever is offset radially with respect to the axis of the piston;

the first end portion of the lever is in the form of a fork;

the body of the lever extends through a window formed in a wall of the casing, and the second end portion of the lever projects outside the casing;

the hydraulic actuating device includes a supply circuit for fluid under pressure, comprising at least one feed duct which connects the actuating chamber for the piston to a source of fluid under pressure arranged outside tile casing, at least a part of being formed in the body of the lever;

the body of the lever includes a longitudinal duct, a first end of which is connected to the actuating chamber for the piston through means for pivoting the said first end portion of the lever on the piston;

the second end of the duct is open on the outside of the clutch casing;

the supply circuit includes a purge duct, at least part of which is formed in the body of the lever.

The purge duct is associated with a threaded purge plug. In this way purging can be carried out on the outside of the casing and in an accessible position. The threaded purge plug may of course be arranged in another position on the lever or outside the latter.

It will be noted that the radial offset of the pivot axis of the lever with respect to the axis of the piston facilitates the supply of fluid to the actuating chamber through the lever, and also facilitates purging of the supply circuit.

BRIEF DESCRIPTION OF THE DRAWINGS

Further features and advantages of the invention will appear on a reading of the detailed description which follows, and for an understanding of which reference is made to the attached drawings, in which:

FIG. 3 is a detail view on a larger scale, showing part of FIG. 2; and

FIG. 4 is a detail view on all enlarged scale showing a modified embodiment of the device shown in FIGS. 1 to 3.

DETAILED DESCRIPTION OF PREFERRED EMBODIMENTS

Figure 2:
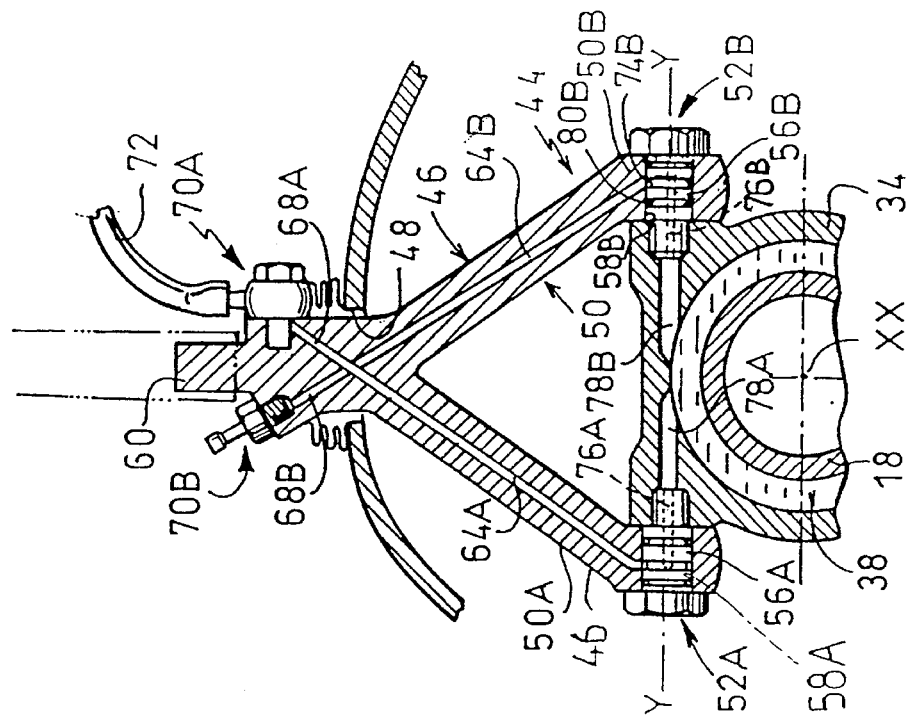
FIG. 2 is a view in cross section taken on the line 2—2 in FIG. 1.

The drawings show a clutch casing 10 which is part of a motor vehicle clutch of the "pull to release" type, being hydraulically actuated.

Not all of the clutch is shown in the drawings and it will not be described in detail, and reference can be made in particular to tile documents previously cited herein for familiarization with various embodiments thereof.

It will be recalled that the motor vehicle clutch commonly comprises a friction disc having friction liners at its outer periphery, a reaction plate, a pressure plate which is movable axially with respect to the reaction plate, a cover plate fixed to the reaction plate, and axially acting resilient means which engage on the cover plate and on the pressure plate, in order to clamp the friction liners between the pressure and reaction plates, which are fixed with respect to the crankshaft of the engine for rotation with it, while the friction disc is mounted on the input shaft of the gearbox for rotation with the latter.

The axially acting resilient means are part of the declutching device for the clutch, and comprise either a diaphragm as in the document FR-A-2 304 826, or coil springs associated with declutching levers, as in the document U.S. Pat. No. 3,995,660.

It will be recalled that in a diaphragm clutch of the pull to release type, the said diaphragm engages on the cover plate through the outer peripheral portion of its Belleville ring, and, through the inner periphery of its said Belleville ring, on an engagement land, which is commonly divided form, of the pressure plate.

An actuating member is associated with the declutching levers or with the diaphragm, and for disengagement, or declutching, of the clutch it is necessary to work in traction on the actuating member by means of a clutch release bearing which is coupled to the actuating member.

Actuation of the release bearing is obtained by means of a hydraulic actuating device which comprises, in a manner described below, an axially movable piston 26, 34, an axially fixed guide member 16, a hydraulic actuating chamber 38 for the piston which is delimited by the guide member 16 and by the piston, and a supply circuit for fluid under pressure, which comprises at least one supply duct that connects the actuating chamber for the piston to a pressure source, for example a clutch cylinder on which the clutch pedal acts.

The pressure source is arranged, in a manner known per se, outside the casing 10. The casing 10 is generally in the form of a hood, and has a radial end wall 12, on tile internal surface 14 of which there is secured, axially and in rotations, a post 16, also referred to as a horn, which has a cylindrical outer engagement surface 18 defining an axis X—X.

The casing 10 encloses, in particular, a clutch release bearing 20 which consists essentially of a ball bearing 22, the outer ring 24 of which is secured, in this example by seaming, to an actuating sleeve 26 for rotation with the latter, with the rotatable inner ring 28 of the said bearing being extended by a sleeve portion 30 which has, in particular, an external radial groove 32 which is arranged to receive tractive coupling means which provide a resilient axial mating connection (not shown) with the actuating member of the clutch (not shown) and therefore with the diaphragm or declutching levers. For more details, reference is made to the documents FR-A-2 304 826 and FR-A-2 653 195 (U.S. Pat. No. 5,113,989), the tractive coupling means normally comprising a radially resiliently deformable coupling such as a coupling ring, fitted in tile groove 32 and making engagement with a surface of the actuating member.

Actuation of the clutch release bearing 20 is obtained by means of a hydraulic actuating device which comprises an actuating piston, consisting of the hollow cylindrical body 34 of the sleeve 26, the inner cylindrical surface 36 of which cooperates at the rear end of the sleeve with the cylindrical surface 18, so as to define a hydraulic actuating chamber 38. The post 16 thus constitutes a guide member for the piston 26, 34, and is in a piston and cylinder relationship with the said piston 26, 34.

It win be noted that the piston 26, 34 is able to move the clutch release bearing 20 axially, the said piston having, as mentioned earlier, an end portion which acts on the clutch release bearing 20.

This release bearing 20 is coupled in axial translation to the piston, by which it is carried.

In the drawings, the coupling is obtained by a seamed connection, but in a modification, as described in the document DE-A-2 815 971, this coupling may be obtained by force-fitting the outer ring 24 of the release bearing 20 on to the associated end of the piston 26, 34, with the said end being accordingly formed with a shoulder.

As described in the document FR-A-2 304 826, it is of course possible to reverse the structures, with the inner ring of the bearing 20 then being coupled axially to the piston 26, 34, while the outer ring of the bearing 20 is rotatable, being coupled in axial mating relationship to the actuating member.

More precisely, the hydraulic actuating chamber 38 is delimited axially by two grooved sealing rings 40 and 42, which are carried respectively by the piston 26, 34 and by the horn 16. To this end, the piston 26, 34 has at its rear end a collar portion which is directed towards the axis of the assembly, while the post 16 has at its forward end a thrust ring which is located axially by a circlip.

The sealing rings 40, 42, which are in the form of lipped sealing rings, are engaged respectively on the collar and on the thrust ring, with a pre-loading spring being interposed for urging the release bearing 20 and the piston 26, 34 towards the wall 12, so as to exert a pre-loading force on the clutch and so as to ensure good operation of the ball bearing of the release bearing 20 in a manner known per se.

A protective bellows is arranged between the rear ends of the piston 26, 34 and post 16.

When the actuating chamber 38 is supplied with fluid under pressure, by means which win be described later herein, it produces an axial displacement of the piston 26, 34 along the axis X—X, in the direction F1 from left to right in FIG. 1, in such a way as to cause disengagement of the clutch to be effected by axial displacement of the clutch release bearing 20.

Figure 1:
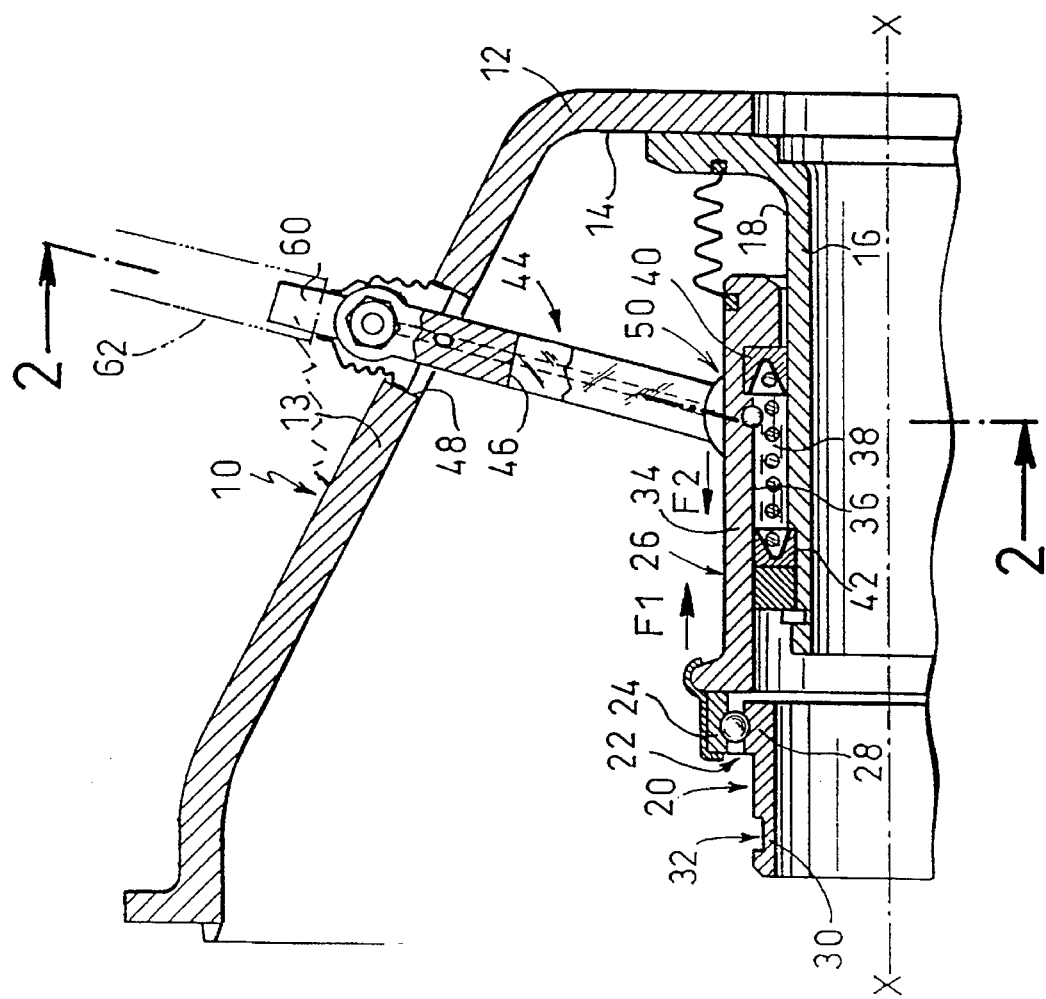
FIG. 1 is a diagrammatic partial view in axial cross section, showing part of a clutch casing and the actuating device for the clutch release bearing made in accordance with the invention.

In accordance with the invention, a lever 44 is provided, which displaces the piston 26, 34 and the clutch release bearing 20 axially in the opposite direction as indicated by the arrow F2, that is to say from right to left in FIG. 1, for the purpose of assembling the clutch release bearing to its actuating member as in the document FR-A-2 304 826. This lever extends partly outside the casing 10.

More precisely, in accordance with the invention, the lever 44 comprises a lever body 46 which extends through the conical portion 13 of the wall of the clutch casing 10, via an oblong hole 48, which in this example is in the form of a window with a rectangular cross section, the length of which extends axially parallel to the axis X—X.

The lower end portion 50 of the lever 44, which is arranged inside the clutch casing 10, is in this example made in the form of a fork having two arms 50A and 50B, which are connected to the body 34 of the piston constituted by the sleeve 26.

For this purpose, each of the branches 50A, 50B of the fork-shaped end portion 50 has, passing through it, a pivot screw 52A, 52B, the threaded end portion of which is screwed into the upper part of the sleeve 34, with its body portion 56A, 56B passing through a corresponding aperture 58A, 58B formed in the end of the arm, so as to define an axis Y—Y for pivoting of the lever 44 n the sleeve 34, which is offset radially outwardly with respect to the axis X—X along which the piston 34 slides.

The second end portion 60 of the lever 44 projects outside the casing 10 in such a way that it is possible to work mechanically on the lever 44, for example by means of a tool 62 indicated diagrammatically in FIG. 1, with a view to increasing the lever arm. This end portion 60 is profiled accordingly, and consists for example of a head into which the hollow tool 62 is inserted in a complementary manner.

It win easily be understood that application of an external mechanical force on the end portion 60 of the lever 44, by causing it to pivot in the clockwise direction with reference to FIG. 1, about a pivot point resulting from the contact of its body 46 with the corresponding edge of the window 48, produces an axial displacement of the piston 26, 34 in the direction indicated by the arrow F2.

This facility for mechanical actuation of the piston 26, 34 is made use of during assembly of the clutch, in order to secure the inner ring 28, 30 axially with the actuating member, this being done in accordance with an axial mating technique such as that described and shown in the document FR-A-2 304 826.

In accordance with another aspect of the invention, the lever 44 includes part of the pressurized fluid supply circuit for the piston 26, 34. This is made possible due to the fact that the second end portion 60 of the lever projects outside the casing 10, as does the body 46, so that it is easy to make duct connections.

To this end, the branch 50A includes a feed duct 64A, for supplying fluid under pressure and having an inner end 66A which is connected to the actuating chamber 38, with its outer end 68A being connected, through a coupling 70A, to a pressurized fluid pipe 72 which is itself connected to a clutch cylinder (not shown).

The hydraulic connection of the end 66A of the feed duct 64A is shown in detail in FIG. 3, from which it can be seen that it is open into a radial groove 74A on the smooth body of the screw 52A that defines the pivot axis, with the groove 74A being itself connected to an axial passage 76A formed within the screw, which is open into a coaxial duct 78A formed in the body 34 of the piston and exhausting into the actuating chamber 38.

Sealing of tile joint is provided by means of two O-rings 80A.

The second branch 50B of the fork-shaped lower end portion 50 of the lever 44 also includes a longitudinal purge duct 64B, the upper end 68B of which is connected to a threaded purge plug 70B, with its lower end being connected to the chamber 38 through an arrangement which is identical with that of the inner end 66A of the feed duct 64A.

Because of this aspect of the invention there is no longer any flexible pipe with the clutch casing, and the piston 26, 34 is also prevented from rotating by the mechanical actuating lever 44 which, for this purpose, extends through the window 48 of the casing 10 with a clearance on the plane of FIG. 1, for the axial displacement of the piston 26 and the release bearing 20, there also being a reduced clearance in the plane of FIG. 2 for preventing rotation of the piston 26.

The body portion 46 of the lever 44 therefore passes, parallel to tile axis X—X (in the axial direction) and with an axial clearance, through the window 48, and with a reduced clearance in the other direction. The axial clearance does not perturb the displacement of the piston 26 in normal operation.

The aperture 48 can of course be axially oblong (parallel to the axis X—X), with rounded ends.

It is of course possible to coat the edges of the window 48 with plastics material, for example one having a low coefficient of friction, so as to reduce noise and friction.

The modified embodiment shown in FIG. 4 win now be described, in which those parts that are identical or similar to those in the embodiment shown in FIGS. 1 to 3 are indicated by the same reference numerals.

In this embodiment, the lever 44 has a body 46 which terminates at its inner end 50 in the form of a single lever, which extends laterally on one side of the sleeve-shaped body 34 of the piston 26.

As before, the pivot axis Y—Y of the lever 44 is offset radially with respect to the axis X—X of the piston 34.

The body 46 and the single arm 50 include the feed duct 64A and purge duct 64B, which are both open in facing relationship with radial grooves 74A, 74B formed in the body of the single pivot screw 52.

It win be appreciated that the grooved sealing rings 40, 42 are protected because the piston 26, 34 is prevented by the lever 44 from rotating.

The pre-loading spring may of course, as call be seen in broken lines in FIG. 1, act between the end portion 60 of the lever and the casing instead of acting between the grooved sealing rings 40, 42.

Besides good operation of the ball bearing of the release bearing 20, this arrangement prevents vibrations at the lever 44. Protective bellows (FIG. 1) can of course be arranged between the window 48 and the end portion 60 of the lever 44. The threaded purge plug may be fitted either on the piston 26, or in another position on the lever 44.

Finally, the pivot axis of the lever 44 may be arranged so that it is not offset radially with respect to the axis of the piston. Nevertheless, this arrangement is less favourable, because it extends the length of the feed duct formed in the lever 44. Besides which, it is more difficult to purge the supply circuit.

As win have been understood, this is the reason why, in FIGS. 1 to 4, the pivot screws 512, 52A, 52B have been arranged in the upper part of the piston 26, 34 and chamber 38.

I claim:

1. A friction clutch of the pull to release type, comprising a clutch casing (10), within which there is arranged a declutching control device (20) which comprises, firstly, a clutch release bearing (20), secondly a hydraulic actuating device (26, 34) comprising at least one actuating piston, one end of which works on the clutch release bearing (20) to urge said release bearing (20) axially in a first direction (F1), so as to cause declutching to take place when the hydraulic actuating device is supplied with fluid under pressure, and, thirdly, a mechanical lever (44) having a body (46), a first end portion (50) coupled in axial translation with the piston (26, 34) and pivoted on the piston about a pivot axis (Y—Y) at right angles to the axis (X—X) of axial sliding movement of the piston (26, 34), and a second end portion (60), with said lever (44) extending through the wall (13) of the casing (10), characterized in that the body (46) of the mechanical lever (44) extends through an oblong aperture (48) formed in the wall of the casing (10), in that the second end portion (60) of the mechanical lever projects outside the casing so as to enable the clutch release bearing (20) to be urged axially, through the piston (26, 34), in a second direction (F2) opposite to the first direction (F1), so that the mechanical lever (44) is an actuating lever.

2. A clutch according to claim 1, characterized in that the second end portion (60) is profiled for cooperation with a tool (62).

3. A clutch according to claim 1, characterized in that the body (46) of the lever (44) extends through the oblong aperture (48) of tile casing (10) with a clearance in the axial direction parallel to the axis (X—X) of axial sliding movement of the piston (26, 34), for axial displacement of the piston (26) and clutch release bearing (20), and with a reduced clearance in the other direction so as to prevent rotation of the piston (26).

4. A clutch according to claim 1, characterized in that the pivot axis (Y—Y) of the lever (44) is offset radially with respect to the axis (X—X) of the piston (26, 34).

5. A clutch according to claim 1, characterized in that the first end portion (50) of the lever is in the form of a fork (50A, 50B).

6. A clutch according to claim 1, characterized in that the first end portion (50) of the lever comprises a single arm which extends on one side of the piston (26).

7. A clutch according to claim 1, characterized in that the hydraulic actuating device includes a supply circuit for fluid under pressure, comprising at least one feed duct which connects the actuating chamber (38) for the piston (26, 34) to a source of fluid under pressure arranged outside the casing (10), and in that at least a part (64A) of said duct is formed in the body (46) of the lever (44).

8. A clutch according to claim 7, characterized in that the body of the lever includes a longitudinal duct (64A), a first end (66A) of which is connected to the actuating chamber (38) for the piston (26, 34) through means (52A) for pivoting said first end portion (50A) of the lever (44) on the piston (26, 34).

9. A clutch according to claim 8, characterized in that the second end (68A) of the duct (64A) is open on the outside of the clutch casing (10).

10. A clutch according to claim 7, characterized in that the supply circuit includes a purge duct (64B), at least part of which is formed in the body (46) of the lever (44).

* * * * *